Oct. 17, 1950  J. R. STOLTZFUS  2,526,295
MILK CAN CART

Filed June 30, 1948  2 Sheets-Sheet 1

J. R. Stoltzfus
INVENTOR
BY Snow & Co.
ATTORNEYS.

Oct. 17, 1950   J. R. STOLTZFUS   2,526,295
MILK CAN CART
Filed June 30, 1948   2 Sheets-Sheet 2
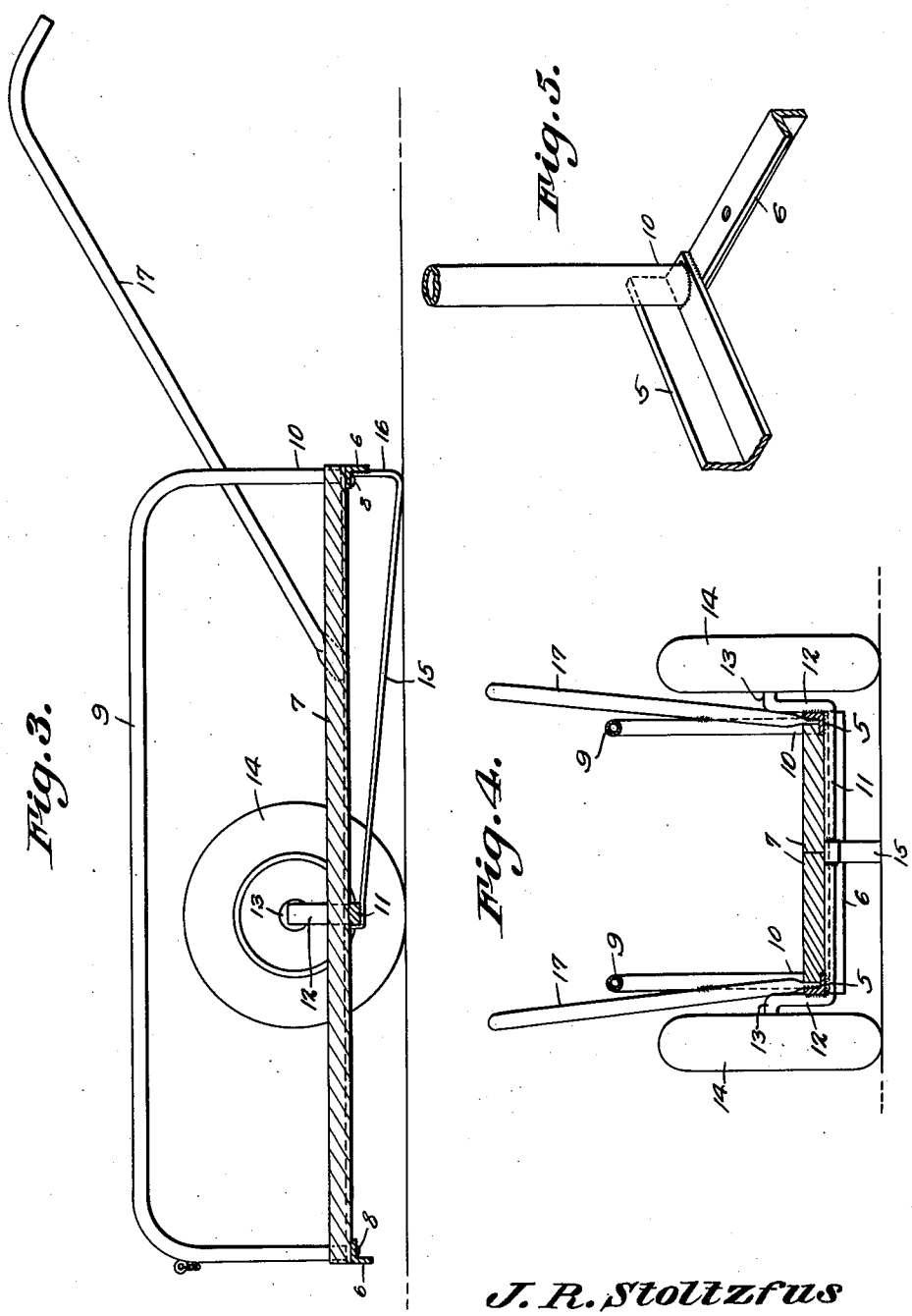
J. R. Stoltzfus
INVENTOR
BY C. A. Snow & Co.
ATTORNEYS.

Patented Oct. 17, 1950

2,526,295

UNITED STATES PATENT OFFICE 2,526,295

MILK CAN CART

Jacob R. Stoltzfus, Belleville, Pa.

Application June 30, 1948, Serial No. 36,082

1 Claim. (Cl. 280—53)

This invention relates to cart construction, and more particularly to carts used in transporting cans of milk from place to place on a farm, as for example, from the milking barn to the dairy, the primary object of the invention being to provide a cart or truck which may be conveniently handled in transporting cans of milk and one wherein the floor of the cart or truck will be low, to the end that the heavy cans of milk may be conveniently placed thereon with the minimum amount of effort.

Another object of the invention is to so locate the axle and supporting wheels of the cart or truck, that the weight of the cans of milk positioned thereon will be in balance to insure ease in handling.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing:

Fig. 3 is a longitudinal sectional view through the cart or truck.

Fig. 4 is a transverse sectional view thereof.

Fig. 5 is a perspective view illustrating a detail construction of the frame of the cart.

Figures 1, 2:
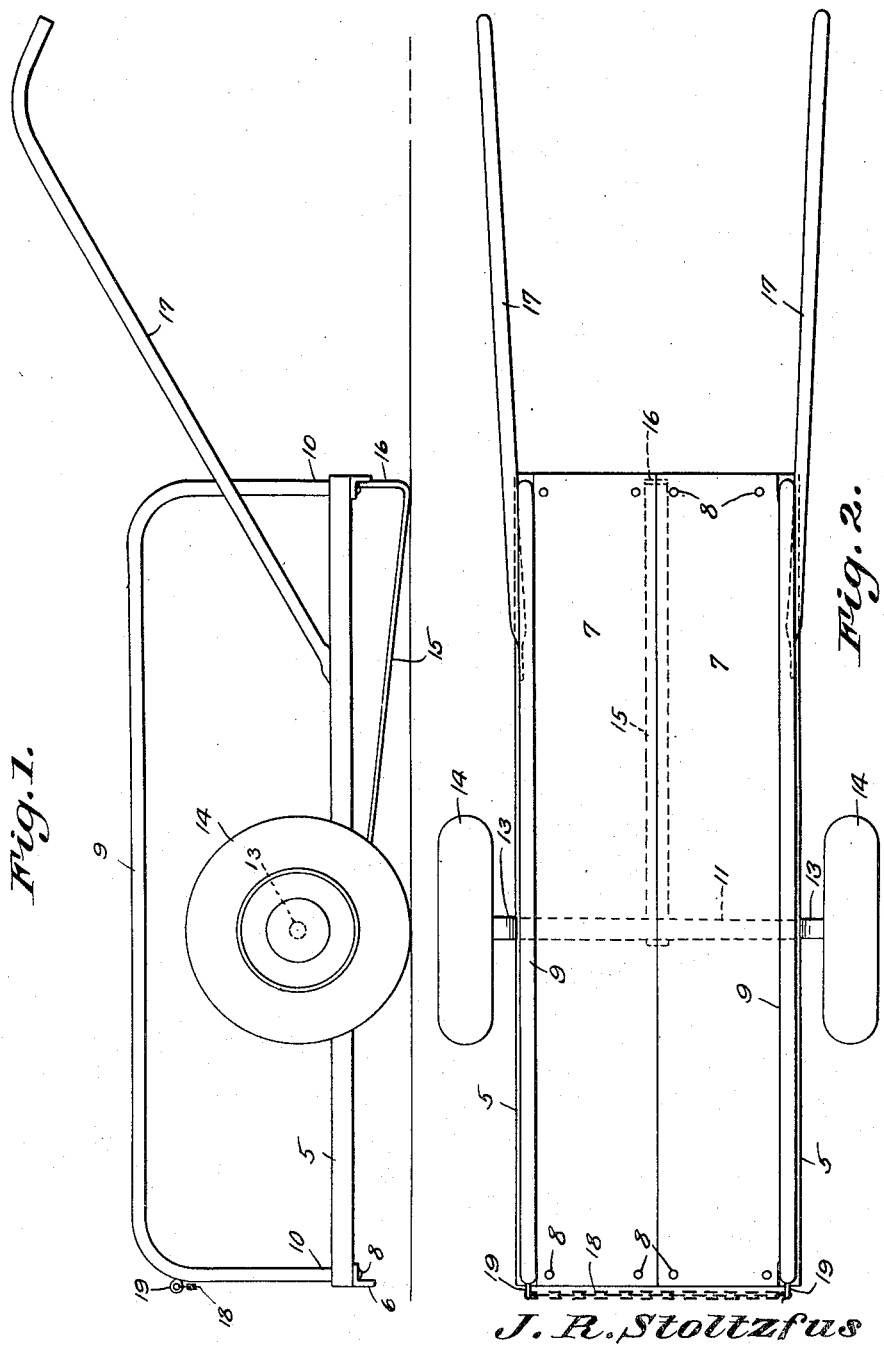
Figure 1 is a side elevational view of a milk cart or truck constructed in accordance with the invention.
Fig. 2 is a plan view thereof.

Referring to the drawings in detail, the frame of the cart or truck embodies side rails 5 connected at their front and rear ends by means of the end rails 6, the side and end rails 5 and 6 being constructed preferably of angle bar material for strength, with the open sides thereof disposed inwardly, as clearly shown by the drawings.

The floor boards 7 are secured to the end bars 6, by means of bolts 8 that are shown as extended through openings in the floor boards and openings in the end rails 6.

The sides of the cart or truck embody substantially U-shaped frames 9, constructed preferably of tubular material with the ends 10 thereof welded to the side rails 5 at the ends of the side rails, as clearly shown by Fig. 5 of the drawings.

The reference character 11 indicates the axle which extends under the side rails 5 where it is welded thereto, as shown by Fig. 4, the axle embodying upwardly extended ends 12 that have outwardly extended portions 13 constituting stub axles on which the wheels 14 are mounted, the wheels being preferably supplied with pneumatic tires as shown by the drawings. Due to this construction, it will be seen that the weight of the milk cans will be supported below the center of gravity of the wheels 14 to maintain the balance of the cart or truck, and at the same time provide a cart wherein the floor is close to the ground surface to permit heavy cans of milk to be readily slid into position when lifted onto the cart or truck.

Secured to the axle 11 at a point intermediate the ends thereof, is the shoe 15, which is in the form of a long bar with its rear end 16 extended upwardly where it is welded to the rear end rail 6 of the cart or truck frame, the shoe being inclined downwardly from the axle so that when the cart rests on the shoe the floor of the cart will be substantially horizontal.

From the drawings it will be obvious that the axle 11 is secured to the frame at a point in advance of a horizontal line drawn transversely through the center of the body of the truck, so that the natural tendency of the truck will be to overbalance rearwardly because of the added weight of the truck at the rear end thereof.

The handles 17 have their forward ends welded to the side rails 5 at points in spaced relation with the rear ends thereof, the handles being inclined upwardly where they contact with the outer surfaces of the ends 10 of the U-shaped frame of the cart or truck, where they are welded thereto to further strengthen the frame and rigidly secure the handles to the frame.

As shown by the drawings, the handles extend appreciable distances beyond the rear end of the cart or truck for convenience in handling.

In order that cans of milk positioned on the cart will be secured against sliding forwardly from the cart, a chain 18 is provided, the chain being stretched across the forward end of the cart, the end links of the chain being secured within the eyes 19 in any suitable manner to permit one end of the chain to be readily released so that the milk cans may be readily positioned thereon.

Having thus described the invention, what is claimed is:

A cart of the class described, comprising a main frame including side rails, end rails welded to the side rails at the ends thereof, floor boards secured to the end rails, side frames rising from the side rails and embodying lengths of tubular metal of inverted U-shape, providing a body open at both ends, an axle secured to the side rails of the main frame at a point intermediate the ends thereof, said axle having offset upwardly and laterally extended end portions on which wheels are mounted, inclined handles secured to the main frame, the forward ends of the handles being connected to the side rails at a point between the axle and rear end of the frame, said handles being also connected to the U-shaped frame, and by means of which the cart is guided, and a chain connecting the forward ends of the side frame preventing displacement of articles supported on the cart.

JACOB R. STOLTZFUS.

REFERENCES CITED

The following references are of record in the file of this patent:

UNITED STATES PATENTS

| Number | Name | Date |
|---|---|---|
| 1,831,026 | Nessan | Nov. 10, 1931 |
| 1,870,163 | Behling | Aug. 2, 1932 |
| 1,885,795 | Barrows | Nov. 1, 1932 |

FOREIGN PATENTS

| Number | Country | Date |
|---|---|---|
| 185,014 | Switzerland | June 30, 1936 |